US008181768B2

(12) United States Patent
Kalm

(10) Patent No.: US 8,181,768 B2
(45) Date of Patent: May 22, 2012

(54) MAILPIECE INSERTER ADAPTED FOR ONE-SIDED OPERATION (OSO) AND INPUT CONVEYOR MODULE THEREFOR

(75) Inventor: W. Scott Kalm, Sarasota, FL (US)

(73) Assignee: Pitney Bowes Inc., Stamford, CT (US)

( * ) Notice: Subject to any disclaimer, the term of this patent is extended or adjusted under 35 U.S.C. 154(b) by 418 days.

(21) Appl. No.: 12/488,968

(22) Filed: Jun. 22, 2009

(65) Prior Publication Data

US 2010/0276249 A1 Nov. 4, 2010

Related U.S. Application Data

(60) Provisional application No. 61/149,446, filed on Feb. 3, 2009.

(51) Int. Cl.
*B65G 43/00* (2006.01)

(52) U.S. Cl. ............... 198/460.3; 198/460.1; 198/460.2; 198/409; 198/607; 198/644; 271/199; 271/202; 271/69; 271/151

(58) Field of Classification Search .................. 198/409, 198/460.1, 460.2, 460.3, 607, 644; 271/69, 271/151, 199, 202
See application file for complete search history.

(56) References Cited

U.S. PATENT DOCUMENTS

| | | | | |
|---|---|---|---|---|
| 4,133,523 | A | 1/1979 | Berthelot | |
| 4,155,441 | A * | 5/1979 | Albrecht et al. | 198/419.2 |
| 4,265,443 | A | 5/1981 | Berthelot | |
| 4,678,172 | A * | 7/1987 | Faltin | 270/18 |
| 4,750,732 | A * | 6/1988 | Hara et al. | 271/258.02 |
| 4,765,502 | A * | 8/1988 | Pintsov et al. | 270/52.19 |
| 5,022,644 | A * | 6/1991 | Burge | 271/270 |
| 5,954,330 | A * | 9/1999 | Rabindran et al. | 271/270 |
| 6,629,690 | B1 * | 10/2003 | Viens | 270/58.01 |
| 7,021,450 | B2 * | 4/2006 | Jones, Jr. | 198/462.1 |
| 7,905,481 | B2 * | 3/2011 | Kalm | 271/198 |
| 2002/0140162 | A1 * | 10/2002 | Gasser et al. | 271/213 |
| 2010/0194025 | A1 * | 8/2010 | Kalm | 271/2 |

FOREIGN PATENT DOCUMENTS

| | | | |
|---|---|---|---|
| DE | 10103116 | A1 | 7/2002 |

* cited by examiner

*Primary Examiner* — Joseph A Dillon, Jr.
(74) *Attorney, Agent, or Firm* — Brian A. Collins; Charles R. Malandra, Jr.; Steven J. Shapiro

(57) ABSTRACT

A mailpiece inserter includes a feed conveyor adapted to feed a shingled stack of mailpiece envelopes along a feed path to an insert module and a chassis module adapted to produce content material for insertion into the mailpiece envelopes processed by the insert module. An envelope position detector is operative to sense a discontinuity in the shingled stack and issues a first position signal indicative thereof, and an input conveyor module is adapted to convey mailpiece envelopes into shingled engagement with an aft end of the shingled stack of mailpiece envelopes on the feed conveyor. The input conveyor module has an input end proximal to a single workstation of the chassis module which enables an operator to (i) feed mailpiece envelopes to the input module and (ii) supply content material to the chassis module. The input conveyor module includes an extensible conveyor, responsive to the first position signal, for advancing the conveyor deck of the input conveyor module toward the aft end of the shingled stack and dispensing mailpiece envelopes into shingled engagement therewith.

13 Claims, 9 Drawing Sheets

MAILPIECE INSERTER ADAPTED FOR ONE-SIDED OPERATION (OSO) AND INPUT CONVEYOR MODULE THEREFOR

RELATED APPLICATIONS

This application claims the benefit of U.S. Provisional Application Ser. No. 61/149446, filed Feb. 3, 2009, the specification of which is hereby incorporated by reference. This application also relates to commonly-owned, co-pending Utility patent application Ser. No. 12/489,042, now patented as U.S. patent number 7,905,481 entitled "METHOD FOR FEEDING A SHINGLED STACK OF SHEET MATERIAL".

TECHNICAL FIELD

This invention relates to an apparatus for handling sheet material and more particularly to a mailpiece inserter adapted for One-Sided-Operation (OSO) and input conveyor module which enables an operator to load sheet material from a single operator location or workstation.

BACKGROUND ART

Mailpiece creation systems such as mailpiece inserters are typically used by organizations such as banks, insurance companies, and utility companies to periodically produce a large volume of mailpieces, e.g., monthly billing or shareholders income/dividend statements. In many respects, mailpiece inserters are analogous to automated assembly equipment inasmuch as sheets, inserts and envelopes are conveyed along a feed path and assembled in or at various modules of the mailpiece inserter. That is, the various modules work cooperatively to process the sheets until a finished mailpiece is produced.

A mailpiece inserter includes a variety of apparatus/modules for conveying and processing sheet material along the feed path. Depending upon the speed and capabilities of the inserter, such apparatus typically include various/modules for (i) feeding and singulating printed content material in a "feeder module", (ii) accumulating the content material to form a multi-sheet collation in an "accumulator", (iii) folding the content material to produce a variety of fold configurations such as a C-fold, Z-fold, bi-fold and gate fold, in a "folder", (iv) feeding mailpiece inserts such as coupons, brochures, and pamphlets, in combination with the content material, in a "chassis module" (v) inserting the folded/unfolded and/or nested content material into an envelope in an "envelope inserter", (vi) sealing the filled envelope in "sealing module" (vii) printing recipient/return addresses and/or postage indicia on the face of the mailpiece envelope at a "print station" and (viii) controlling the flow and speed of the content material at various locations along the feed path of the mailpiece inserter by a series of "buffer stations". In addition to these commonly employed apparatus/modules, mailpiece inserter may also include other modules for (i) binding the module to close and seal filled mailpiece envelopes and a (ii) a printing module for addressing and/or printing postage indicia.

These modules are typically arranged in series or parallel to maximize the available floor space and minimize the total "footprint" of the inserter. Depending upon the arrangement of the various modules, it is oftentimes necessary for operators to feed the inserters, i.e., with envelopes, inserts and other sheet material, from two or more locations about the periphery of the inserter. Furthermore, depending upon the "rate of fill/feed", some stations are more workload intensive than other stations. For example, an insert station of a chassis module may demand seventy-five percent (75%) of an operator's time while an envelope feed station may require twenty-five percent (25%) of another operator.

While a cursory examination of the workload requirements may lead to the conclusion that greater efficiencies are achievable, i.e., by employing a single operator to perform both functions, the configuration of many mailpiece inserters oftentimes does not facilitate the combination of these operations. For example, attending to the chassis module, i.e., adding inserts/sheet material to each of the overhead feeders, is performed from one side of the inserter while attending to the envelope feed station is performed from another side of the inserter. As such, it is difficult for a single operator to move between stations to maintain i.e., feeding sheet material to, both stations.

In addition to the distance and inconvenience associated with maintaining each station, it is important to ensure that the envelope feed station is properly "primed" and continuously fed. That is, the first six (6) to ten (10) envelopes must be fed into the ingestion area of the feed station at a prescribed angle and, thereafter, by a continuous stream of shingled envelopes. Should a gap, break/interruption, or discontinuity develop in a shingled stack, it will be necessary to "re-prime" the feed station. As such, re-priming requires that the feed station be temporarily stopped/halted such that the next six (6) to ten (10) envelopes, i.e., those immediately following the gap/break in the stack, be fed into the ingestion area of the station. It will be appreciated that the requirement to re-prime the station results in inefficient operation of the station.

A need, therefore, exists for a conveyor system which facilitates one-sided operation of a sheet handling apparatus, such as a mailpiece inserter, to maintain efficient operation thereof, e.g., a continuous stack of shingled sheet material.

BRIEF DESCRIPTION OF THE DRAWINGS

The accompanying drawings illustrate presently preferred embodiments of the invention and, together with the detailed description given below, serve to explain the principles of the invention. As shown throughout the drawings, like reference numerals designate like or corresponding parts.

SUMMARY OF THE INVENTION

Figure 1:
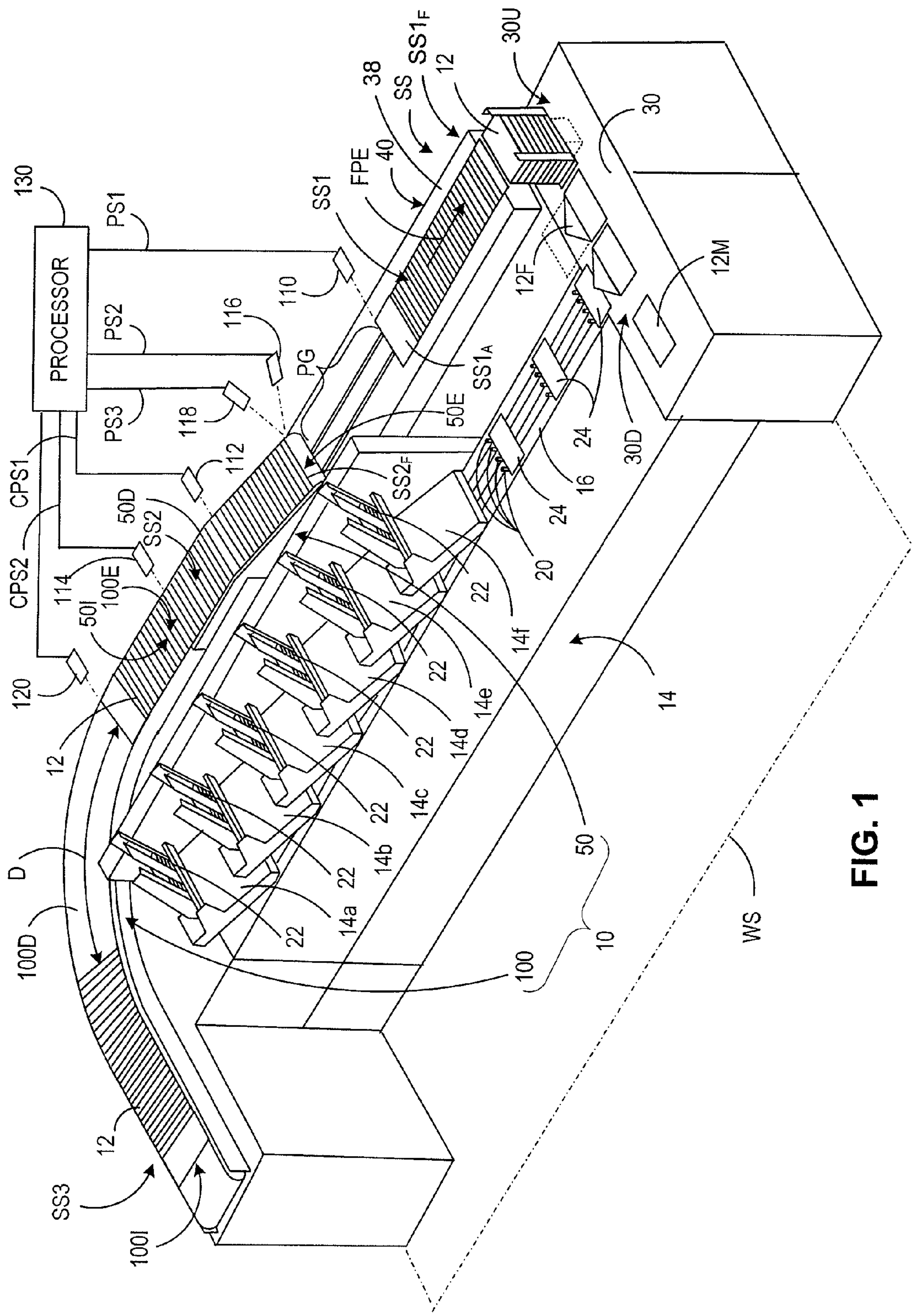
FIG. 1 is a perspective view of a mailpiece inserter including a One-Sided-Operation (OSO) input module according to the present invention including Right-Angle Turn (RAT) input and extensible conveyors for receiving and delivering mailpiece envelopes to a feed conveyor which, in turn, delivers the envelopes to an insert module.

A mailpiece inserter is provided including a feed conveyor adapted to feed a shingled stack of mailpiece envelopes along a feed path to an insert module and a chassis module adapted to produce content material for insertion into the mailpiece envelopes processed by the insert module. An envelope position detector is operative to sense a discontinuity in the shingled stack and issues a first position signal indicative thereof, and an input conveyor module is adapted to convey mailpiece envelopes into shingled engagement with an aft end of the shingled stack of mailpiece envelopes on the feed conveyor. The input conveyor module has an input end proximal to a single workstation of the chassis module which enables an operator to (i) feed mailpiece envelopes to the input module and (ii) supply content material to the chassis module. The input conveyor module includes an extensible conveyor, responsive to the first position signal, for advancing the conveyor deck of the input conveyor module toward the aft end of the shingled stack and dispensing mailpiece envelopes into shingled engagement therewith.

A conveyor module is also disclosed for delivering a shingled stack of sheet material to a processing station comprising a feed conveyor for conveying a forward end of the shingled stack to the processing station and an extensible conveyor for conveying additional sheet material to the aft end of the shingled stack. The extensible conveyor includes fixed and extensible segments wherein the extensible segment is operative to extend and retract relative to the fixed segment. Moreover, the extensible segment is spatially positioned above the feed conveyor to gravity feed additional sheet material into shingled engagement with the aft end of the shingled stack. A position detector determines when the aft end of the shingled stack reaches a location along the feed path. A drive system is responsive to a position signal issued by the position detector to (i) extend the extensible segment over the aft end of the shingled stack, (ii) drive the continuous belt for conveying the additional sheet material onto the shingled stack, and (iii) retract the extensible segment while continuing to dispense the additional sheet material onto the feed conveyor.

DETAILED DESCRIPTION

A One-Sided Operation (OSO) input module 10 is described and depicted for use in combination with a conventional mailpiece inserter having a plurality of stations/modules for processing sheet material and producing a mailpiece. In the context used herein "sheet material" is any substantially planar substrate such as sheets of paper, cardboard, mailpiece envelopes, postcards, laminate etc, While the invention is described in the context of a mailpiece inserter, the OSO input module 10 is applicable to the dispensation of any sheet material which requires that the material remain shingled and continuously feed to a processing station. Furthermore, while the mailpiece inserter disclosed and illustrated herein depicts the stations/modules which are most relevant to the inventive system/method, it should be borne in mind that a typical mailpiece inserter may include additional, or alternative, stations/modules other than those depicted in the illustrated embodiment.

Figure 2:
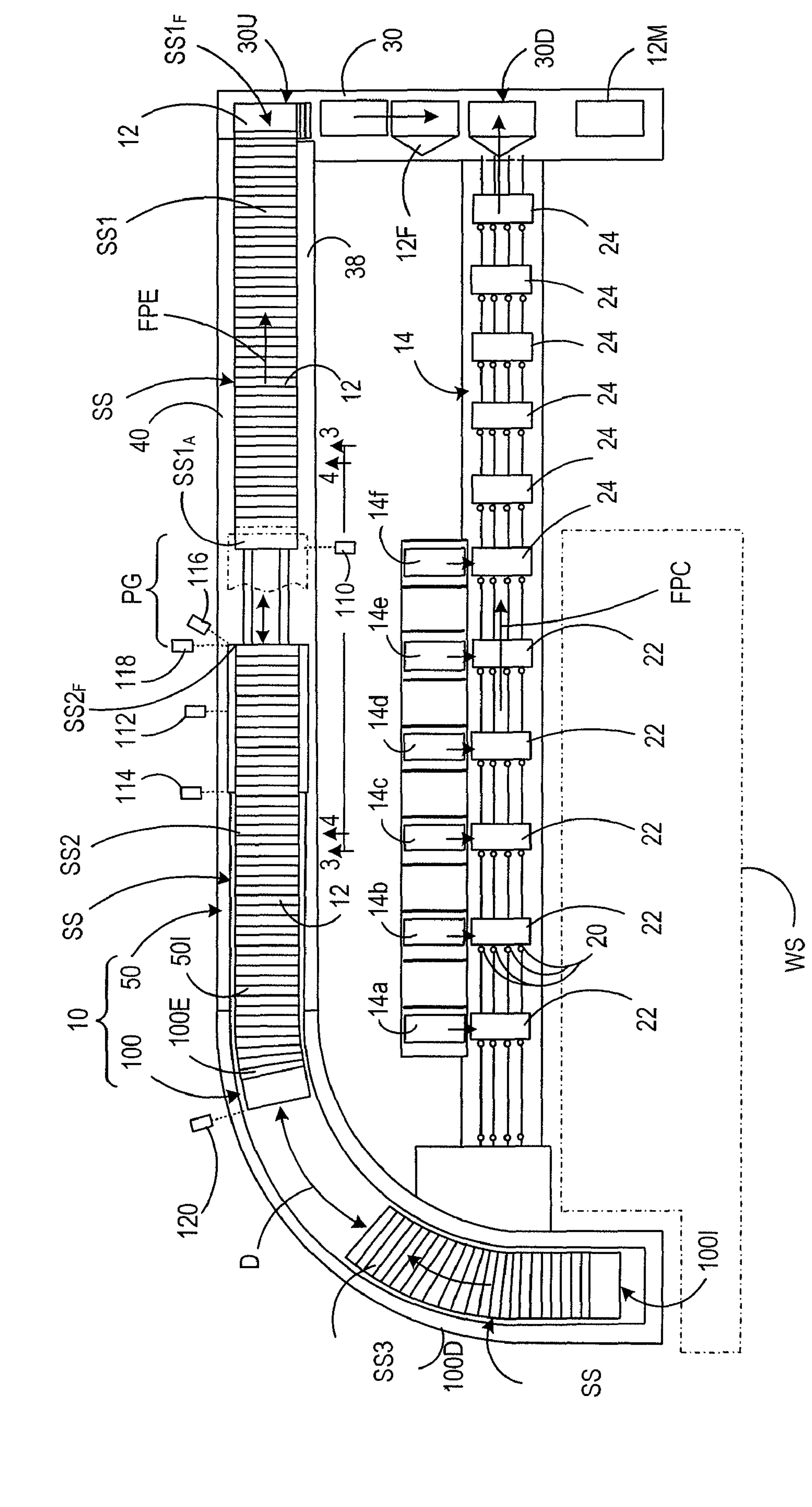
FIG. 2 is a schematic top view of the mailpiece inserter and OSO input module shown in FIG. 1.

FIGS. 1 and 2 depict perspective and top views of a mailpiece inserter 8 having an OSO input module 10 to facilitate loading/feeding of mailpiece envelopes 12 from one side of the mailpiece inserter 8. Furthermore, the OSO input module 10 provides a continuous stream/flow of mailpiece envelopes 12 to optimize throughput by minimizing/eliminating downtime of the inserter 8. Before discussing the details and integration of the OSO input module 10 with the other modules of the inserter 8, it will be useful to provide a brief operational overview of the various stations/modules of mailpiece inserter 8.

The mailpiece inserter 8 includes a chassis module 14 having a plurality of overhead feeders **14*a*-14*f* for building a collation of content material on the deck 16 of the chassis module 14. More specifically, the chassis module deck 16 includes a plurality of transport fingers 20 for engaging sheet material 22 laid on the deck 16 by an upstream feeder (not shown) or added to the sheet material 22 by the overhead feeders 14*a*-14*f*. The transport fingers 20 move the sheet material 22 beneath each of the overhead feeders 14*a*-14*f* such that additional inserts may be combined with the sheets 22, i.e., as the sheets pass under the feeders 14*a*-14*f*, to form a multi-sheet collation 24. These collations 24 are conveyed along the deck 16 to an insert module 30 which prepares the mailpiece envelopes 12 for receiving the collations 24. While the chassis module 14 is defined herein as including overhead feeders 14*a*-14*f* and transport fingers 20 for building and transporting sheet material/collations 22, 24, it should be appreciated that the chassis module 14** may be any device/system for preparing and conveying content material for insertion into a mailpiece envelope.

As sheet material collations 24 are produced and conveyed along the deck 16 of the chassis module 14, mailpiece envelopes 12 are, simultaneously, conveyed on the deck 38 of a feed conveyor 40 to an upstream end 30U of the insert module 30. More specifically, a first portion SS1 of the shingled stack SS of mailpiece envelopes 12 is prepared on the transport deck 38 and conveyed along a feed path FPE which is substantially parallel to the feed path FPC of the sheet material collations 24. In the context used herein, a "shingled stack" means mailpiece envelopes which are stacked in a shingled arrangement along the feed path FPE of the OSO input module 10 and/or feed conveyor 40, including portions SS1, SS2, SS3 thereof which define a discontinuity in the shingled stack. Furthermore, while the shingled stack SS refers to any shingled envelopes conveyed along the feed path FPE, the specification may refer to first and second portions SS1, SS2 or, alternatively, downstream and upstream portions (i.e., the downstream portion is that portion closest to the insert module and the upstream portion which follows the downstream portion as the stack is conveyed along the feed path FPE) to define where a discontinuity begins and ends.

A forward end SS1F of a first portion SS1 of the stack is primed for ingestion by the insert module 30 to facilitate the feed of subsequent envelopes 12 from the stack. The envelopes 12 are singulated upon ingestion and conveyed from the upstream to the downstream ends, 30U and 30D, respectively, of the insert module 30. As the envelopes 12 travel downstream, the flap 12F of each envelope 12 is lifted to open the envelope 12 for receipt of the content material 24 produced by the chassis module 14. Once filled, the flap 12F is moistened and sealed against the body of the envelope to produce a finished mailpiece 12M. Thereafter, the finished mailpieces 12M are stacked on a large conveyor tray (not shown) to await further processing, e.g., address printing or postage metering. Mailpiece inserters of the type described are fabricated and supplied under the trade name FLOWMASTER RS by Sure-Feed Engineering located in Clearwater, Fla., a wholly-owned subsidiary of Pitney Bowes Inc. located in Stamford, Conn.

The throughput of the mailpiece inserter 8 determines the rate of sheet material consumption and the need to replenish the supply of sheet material/inserts 22, 24 and mailpiece envelopes 12. As the throughput increases, greater demands are placed on an operator to fill each of the overhead feeders 14*a*-14*f* while maintaining a continuous supply of mailpiece envelopes 12 to the insert module 30. The OSO input module 10 of the present invention facilitates these operations by permitting an operator to replenish the supply of sheet material/inserts 22 and envelopes 12 from a single workstation/area WS. That is, the OSO input module 10 enables an operator to feed mailpiece envelopes/sheet material 12, 22 from one side of the inserter 8, i.e., without ignoring one operation to attend to another. Furthermore, the OSO input module 10 accommodates short feed interruptions, i.e., a discontinuity D in the shingled stack SS, by introducing a "prescribed gap" in the shingled stack SS and employing an extensible conveyor 50 to fill the prescribed gap PG. These features will be more clearly understood by the following description and illustrations.

In FIGS. 2-5, the OSO input module 10 includes an extensible conveyor 50 and a Right Angle Turn input module 100 upstream of the extensible conveyor 50. The extensible conveyor 50 is aligned with the deck 38 of the feed conveyor 40 and comprises a (i) continuous belt 52 defining a deck 50D for supporting and conveying mailpiece envelopes 12, (ii) an extensible support structure 60 adapted to support and accommodate motion of the continuous belt 52, and (iii) a drive system 80 operative to extend and retract the continuous belt 52 along the feed path FPE of the feed conveyor 40, and drive the belt 52 to dispense additional mailpiece envelopes 12, i.e., a second portion SS2 of the shingled stack SS onto the aft end SS1A of the first portion SS1 of the shingled stack SS. In the context used herein, the extensible and/or RAT conveyors 50, 100 of the OSO input module 10 may be viewed as upstream conveyors which are disposed over, and aligned with, the feed conveyor 40 which may be viewed as downstream conveyor relative to the upstream extensible and RAT conveyors 50, 100.

The belt 52 of the extensible conveyor 50 has a width dimension which is slightly larger than the width of the envelopes to be conveyed, is fabricated from a low elongation material, and includes a plurality of cogs (not shown) molded/machined into each side of its lateral edges. With respect to the latter, the cogs engage gear teeth of the support structure 60 to precisely control the motion/displacement of the continuous belt 52. The significance of cogs in the belt 52 will be more thoroughly understood when discussing the operation and control of the extensible conveyor 50.

The extensible support structure 60 includes an extensible segment 62 operative to extend and retract relative to a fixed segment 64. Each of the extensible and fixed segments 62, 64 includes a plurality of rolling elements 66E, 66F which function to support and accommodate motion of the continuous belt 52. While the rolling elements 66E, 66F are illustrated as cylindrical rollers, it will be appreciated that other any structure which supports the belt and rotates about an axis to facilitate motion thereof may be employed. Each rolling element 66E, 66F is mounted for rotation between sidewall structures 68E, 68F of the respective extensible and fixed segments 62, 64. More specifically, the rolling elements 66E are mounted for rotation between the sidewall structures 68E of the extensible segment 62, and the rolling elements 66F are mounted for rotation between the sidewall structures 68F of the fixed segment 64.

The rolling elements 66E, 66F and continuous belt 52 are arranged such that the deck 50D of the belt 52 is advanced forward and aft (i.e., extended and retracted) by the relative movement of the extensible segment 62. This may be achieved by uniquely arranging of the rolling elements 66E, 66F such that the deck 50D translates fore and aft while the belt 52 may also be driven around the rolling elements 66E, 66F. More specifically, this may be achieved by causing a coupled pair of rolling elements 66E associated with the extensible segment 62 to move relative to a rolling element 66F associated with the fixed segment 64, or enabling at least one of the rolling elements 66E, 66F associated with either of the segments 62, 64 to move independent of the other rolling elements 66E, 66F, e.g., within a track or other guided mount.

Figure 3:
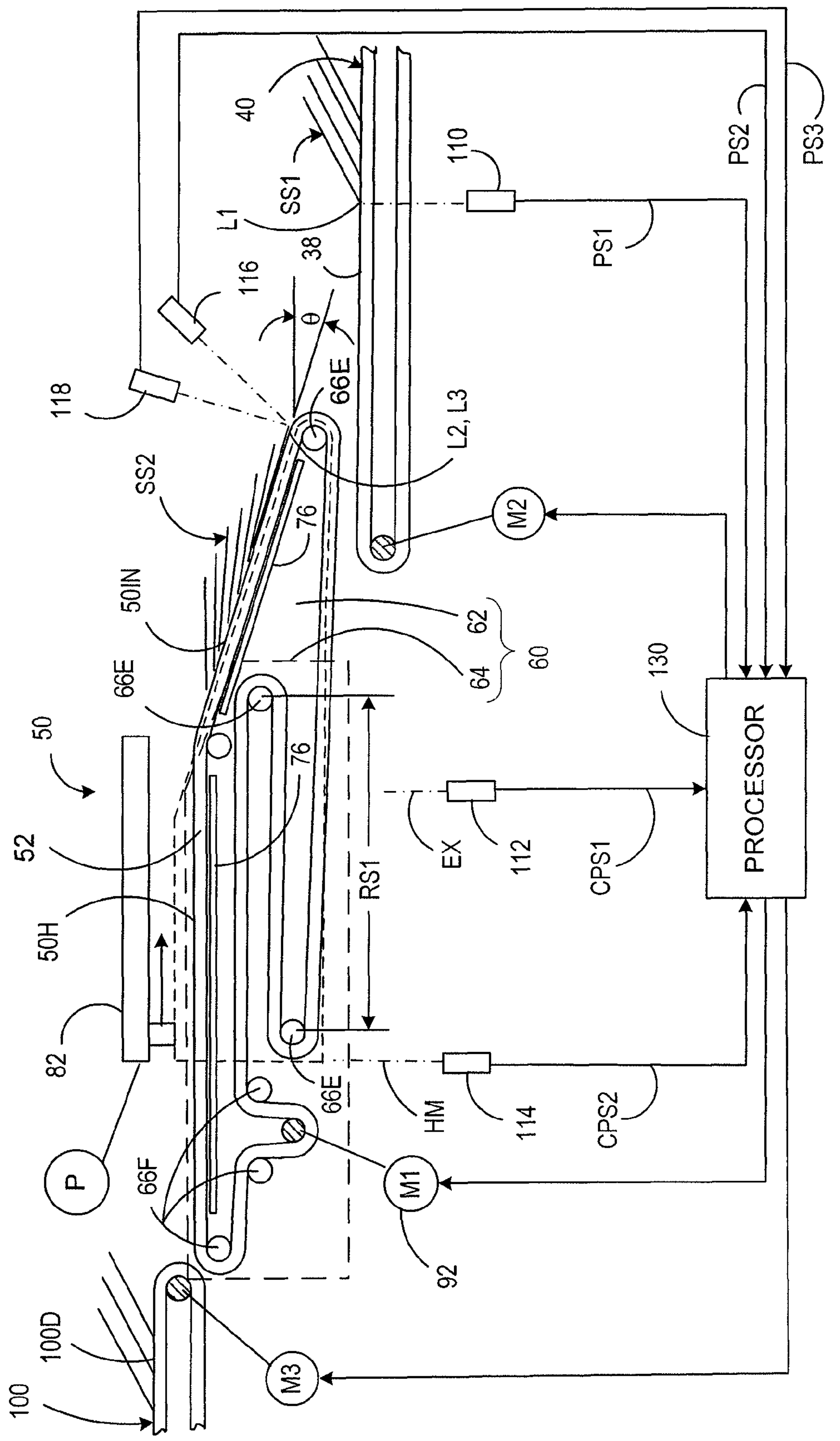
FIG. 3 is a schematic sectional view from the perspective of line 3-3 of FIG. 2 wherein the extensible conveyor is in a retracted position.
Figure 4:
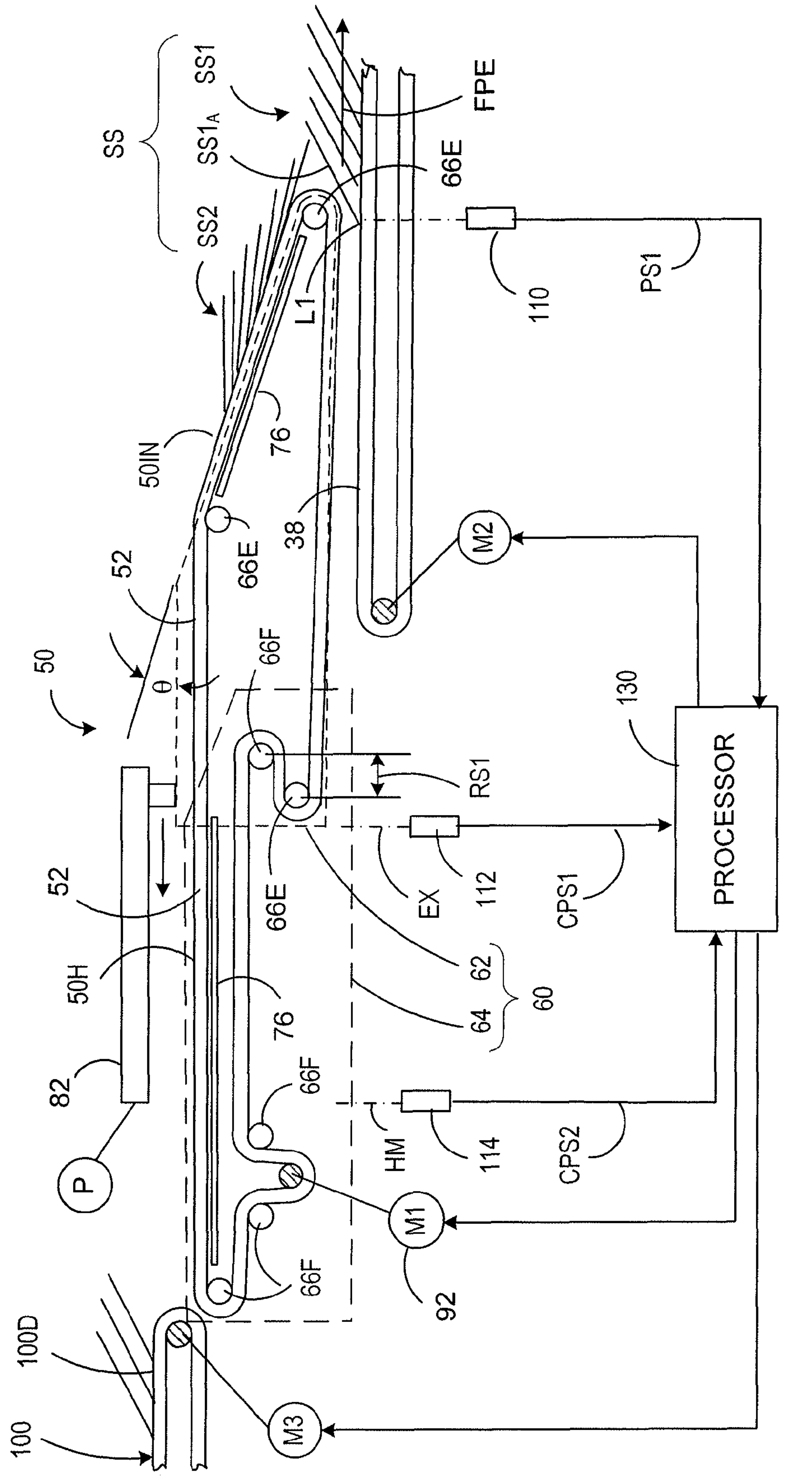
FIG. 4 is a schematic sectional view from the perspective of line 4-4 of FIG. 2 wherein the extensible conveyor is in an extended position.

In one embodiment of the invention, shown in FIGS. 3 and 4, the means for extending/retracting the belt is effected by arranging the rolling elements 66E, 66F such that the belt 52 follows a serpentine path and defines a recurved segment RS1 (i.e., an S-shape). In the context used herein, the term "recurved segment" is a segment of the continuous belt 52 which (i) extends between a rolling element 66E associated with the extensible segment 62 and a rolling element 66F associated with the fixed segment 64, and (ii) wraps around each of the rolling elements 66E, 66F on opposite sides, e.g., a first end of the segment RS1 engages the rolling element 66E on a side corresponding to the upper surface of the belt 52, i.e., the deck 50D for transporting envelopes 12, and a second end of the segment RS1 engages the rolling element 66F on a side corresponding to the underside surface of the belt 52. As the extensible segment 62 translates forward and aft, therefore, the recurved segment RS1 of the belt 52 shortens and lengthens to extend and retract the belt 52.

Figure 8:
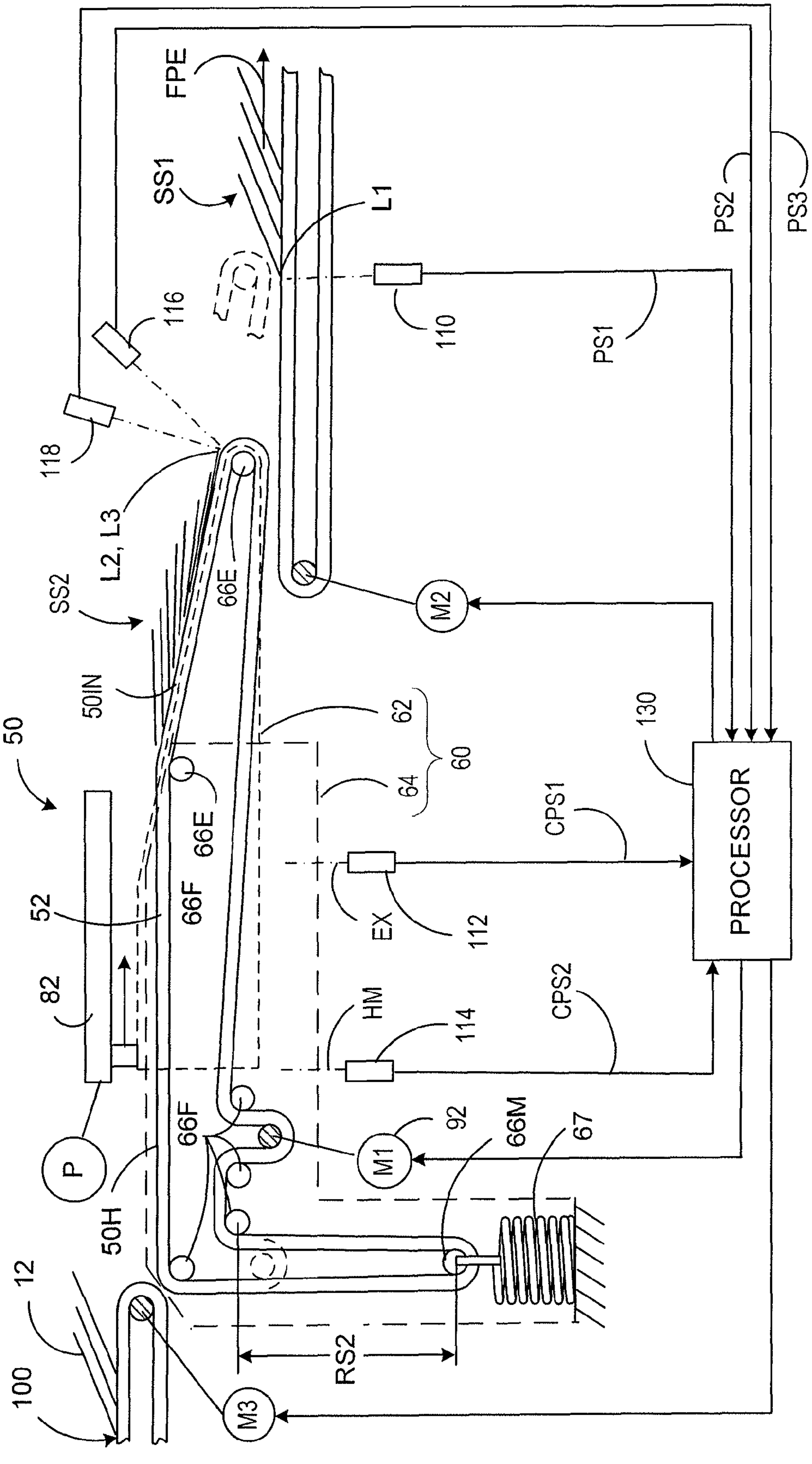
FIG. 8 is a schematic sectional view of an alternate embodiment of the extensible conveyor, i.e., from an identical perspective and position as that portrayed in FIG. 3 above, wherein the recurved segment is produced by wrapping the continuous belt around a spring biased rolling element capable of displacing vertically by an amount equal to the horizontal displacement of the extensible segment.
Figure 9:
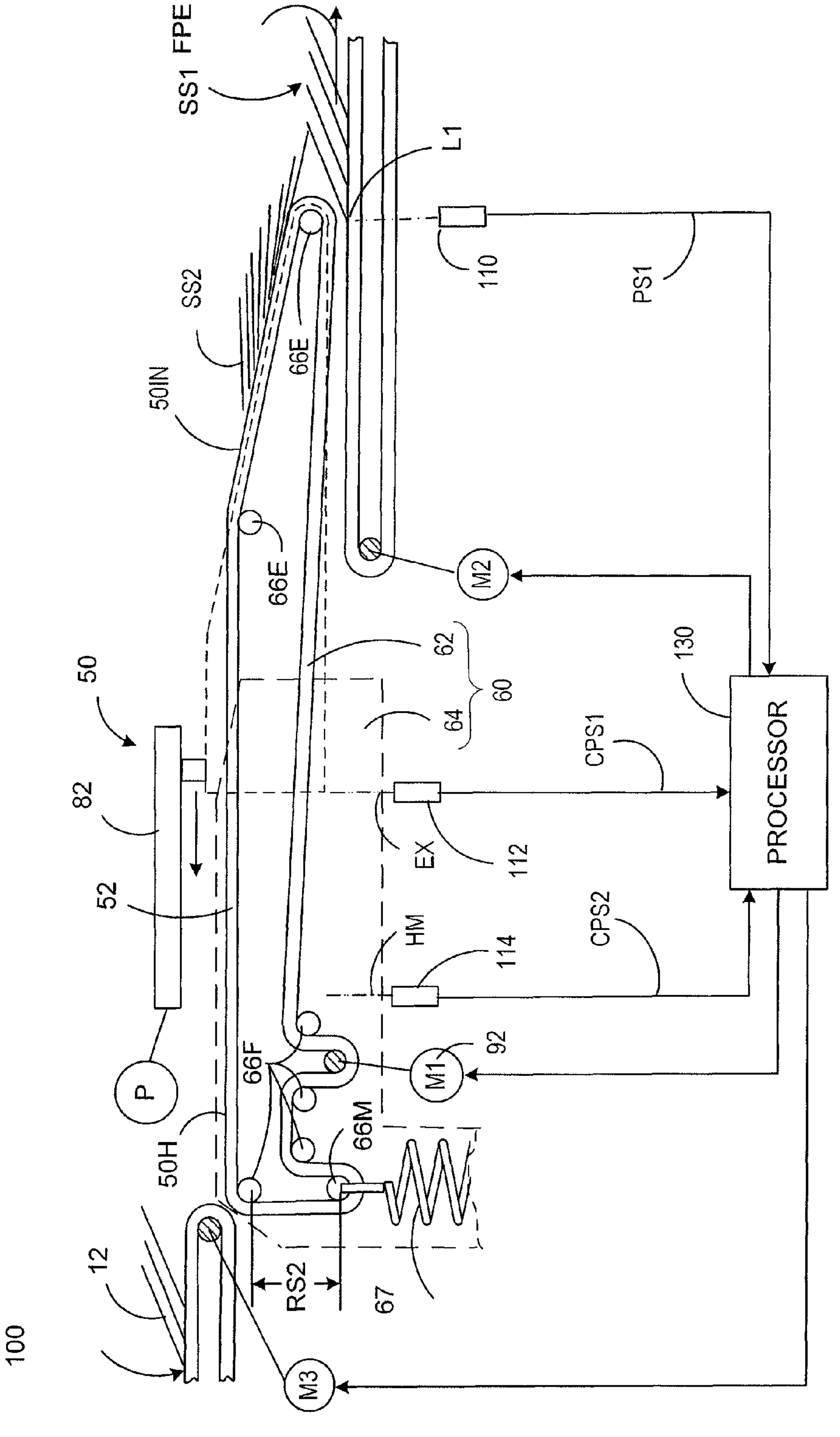
FIG. 9 is a schematic sectional view of the alternate embodiment shown in FIG. 8, wherein the extensible conveyor is in a fully extended position

In another embodiment of the invention, shown in FIGS. 8 and 9, the means for extending/retracting the belt is effected by a recurved segment RS2 produced by mounting one of the rolling elements 66M in a guide track which facilitates independent motion of the rolling element 66M. In this embodiment, the rolling element 66M translates vertically, upwardly and downwardly, as the extensible segment 62 translates forward and aft. More specifically, the rolling element 66M moves upwardly in response to extension of the extensible segment 62, i.e., due to the forward movement of the segment 62 and forward advancement of the belt 52. Retraction of the extensible segment 62 causes the rolling element 66M to move downwardly under the influence of a tension spring 67. That is, as the deck 50D of the belt 52 shifts aft to reduce its length, an equal length of belt is moved downwardly with the rolling element 66M. Once again, as the extensible segment 62 translates forward and aft, the recurved segment RS2 of the belt 52 shortens and lengthens to extend and retract the belt 52. These relationships will be better understood when describing the interaction of the extensible and fixed segments 62, 64 and the operation of the extensible conveyor 50.

In the embodiment illustrated in FIGS. 3 and 4, the extensible segment 62 translates relative to the fixed segment 64, i.e., in the direction of the feed path FPE, by means of a track or guide (not shown) interposing the sidewall structures 68E, 68F of the segments 62, 64. The track or guide may be similar in construction to the rails of a conventional desk or cabinet draw or, alternatively, a series of rollers may rotationally mounted to one of the segments 62, 64 for engaging a elongate slot of the other of the segments 62, 64.

Figure 5:
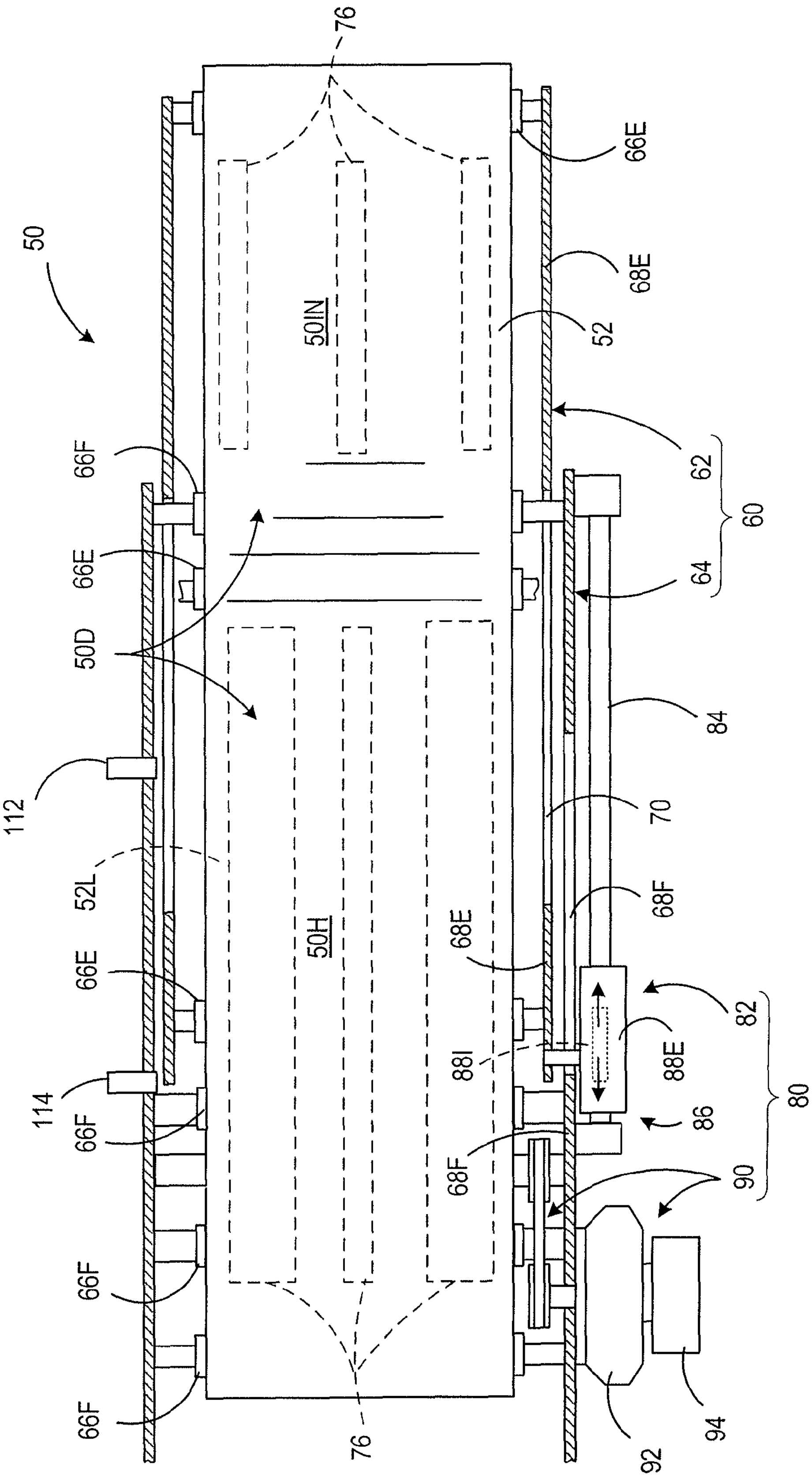
FIG. 5 is top view of the extensible conveyor of the OSO input module.

In FIG. 5, the drive system 80 includes a linear actuator 82 operative to extend and retract the extensible segment 62 relative to the fixed segment 64, and a belt drive mechanism 90 operative to drive the continuous belt 52 about the rolling elements 66E, 66F. More specifically, the linear actuator 82 includes an elongate shaft 84 and a moveable element 86 slideably mounted over or within the elongate shaft 84. The elongate shaft 84 is mounted at one end to a sidewall 68F of the fixed segment 64 while the moveable element is mounted to a sidewall 68E of the extensible element 62. The moveable element 86 may be driven along the shaft 84 electrically i.e., by an induction coil, or pneumatically by a pressure chamber disposed internally of the shaft 84. The moveable element 86 may comprise a coupled pair of ferromagnetic elements wherein a ferromagnetic piston/plug 881 (shown in phantom) slides internally of the shaft 84 by the application of pressure to one side of the ferromagnetic piston/plug while venting the opposing side to atmospheric pressure. A ferromagnetic outer sleeve/ring 88E, disposed externally of the shaft 84, is magnetically coupled to the ferromagnetic piston/plug 881 to follow its motion. That is, the internal ferromagnetic piston/plug 881 translates linearly within the shaft 84 (in response to pneumatic pressure) while the ferromagnetic outer sleeve/ring 88E follows the internal piston/plug 881 to extend and retract the extensible segment 62.

The belt drive mechanism 90 includes a motor 92 for driving the continuous belt 52 by means of an overrunning clutch 94. More specifically, the motor 92 drives the overrunning clutch 94 which drives the belt 52 around the rolling elements 66E, 66F to advance the belt 52 along the feed path FPE. The clutch 94 drives the belt 52 in one direction and "overruns" in the opposite direction. The overrunning feature is necessary to prevent the extensible conveyor 50 from back-driving the clutch 94 when the extensible segment 62 moves forwardly from is retracted or home position. In the described embodiment, the overrunning clutch 94 is a sprag clutch, though the clutch may be any of a variety of clutch types.

The extensible conveyor 50 is shown in the home or retracted position in FIG. 3 and in the extended position in FIG. 4. By examination of the figures, it will be apparent that the continuous belt 52 follows a serpentine path around the rolling elements 66E, 66F, and that the extension length of the module 50 is directly proportional to the belt length within the recurved segment. As alluded to earlier, when the extensible conveyor 50 is retracted, i.e., in its home position (as seen in FIG. 3), the length of the recurved segment is at a maximum, and when the extensible conveyor 50 is fully extended (as seen in FIG. 4), the length of the recurved segment is a minimum. The extensible support structure 60, which includes the rolling elements and sidewall structures 66E, 66F, 68E, 68F, also includes a plurality of runners/rails 76 (shown in phantom in FIG. 5) operative to support, and slideably engage, an underside surface 52L of the belt 52. The rails 76 are disposed between pairs of rolling elements 66E, 66F and support an upper portion of the belt 52 to maintain a substantially planar upper surface 52U. That is, since the continuous belt 52 is not under tension, the rails 76 function to prevent the upper belt surface 52U from drooping/sagging under the force of gravity.

The deck 50D of the belt 52 includes a horizontal deck 50H and an inclined deck 50IN disposed downstream of the horizontal deck 50H. Hence, mailpiece envelopes 12 transition from the horizontal deck 50H to the inclined deck 50IN and move downwardly toward the deck 38 of the feed conveyor 40, i.e., as mailpiece envelopes 12 are conveyed along the inclined deck 50IN. The slope of the inclined deck 50IN is a function of the height dimension of the extensible conveyor 50, however, to prevent the second portion SS2 of the shingled envelope stack SS from cascading/sliding downwardly under the force of gravity, it will be appreciated that the slope angle 8 of the inclined deck 50IN is preferably shallow. The slope angle 8 of the inclined deck 50IN becomes increasingly sensitive depending upon the type and/or surface characteristics of the mailpiece envelopes 12. For example, envelopes 12 having a smooth satin surface (i.e., low friction surface) will require that the inclined deck 501N define a low slope angle θ while envelopes 12 having a fibrous, heavy weight, surface (i.e., a high friction surface) may provide greater flexibility of design by enabling a higher slope angle θ. In the described embodiment, the slope angle θ is preferably less than about forty degrees (40°) to about ten degrees (10°) and, more preferably, about thirty degrees (30°) to about fifteen degrees (15°).

In FIGS. 1 through 5, the Right Angle Turn (RAT) input conveyor 100 bridges, i.e., is disposed over, an upstream end of the chassis module 14 and curves into alignment with the input end 501 (see FIGS. 1 and 2) of the extensible conveyor 50. More specifically, the RAT input conveyor 100 is disposed upstream of the extensible conveyor 50 and includes: (i) an input end 100I adapted to receive the second, third and/or additional portions SS2, SS3 . . . SSN of the shingled stack SS, (ii) an output end 100E aligned with, and adapted to supply, the input end 501 of the extensible conveyor 50, and (iii) an arcuate transport deck 100D extending from the operator workstation WS of the chassis module 14 to the input end 501 of the extensible conveyor 50. The deck 100D may be fabricated from a compliant woven fabric to facilitate redirection in the plane of the fabric, i.e., forming an arc over a span of about six to ten feet (6' to 10'). Alternatively, the deck 104 may comprise a series of interlocking molded plastic elements which may be variably spaced along the length of each plastic element. That is, the elements may be closely spaced along one edge and separated along the opposite edge to produce a "fanning" effect. The combined fanning of the elements causes the deck to turn as a function of its geometry, i.e., the angular increments which are achievable between each of the elements. This type of conveyor deck, also known as a "turn curve belt", is available from Ashworth Bros. Inc. located in Winchester, Va. under the trade name Advantage 120 and Advantage 200.

A plurality of Envelope Position Detectors (EPDs) 110, 116, 118 and 120 are operative to sense a discontinuity in the shingled stack SS of mailpiece envelopes 12 and issue position signals PS1-PS4 indicative of the discontinuity. Furthermore, first and second Conveyor Position Detectors (CPDs) 112, 114 are operative to sense the position of the extensible conveyor 50 and issue position signals CPS1, CPS2 indicative of the extended/retracted positions EX, HM of the extensible conveyor segments 62 relative to the fixed conveyor segment 64. Upon sensing a discontinuity in the shingled envelope stack SS, a processor 130, responsive to the position signals CPS1-CPS2, drives/throttles the speed of the input conveyors 40, 50, 100 and the drive system 80 for extending and retracting the extensible conveyor 50.

To understand the operation of the OSO input module 10 and its integration with the mailpiece inserter 8, it is best to examine a hypothetical involving an operator feeding the OSO and chassis modules 10, 14 from a single side, i.e., from the workstation/area WS, adjacent the overhead feeders 14_a_-14_f_ of the chassis module 14. Upon initial set-up of the mailpiece inserter 8, a first portion SS1 of the shingled envelope stack SS is disposed along the deck 38 of the feed conveyor 40. Set-up also includes the step of priming the forward end SS1F of the first portion SS1 of the shingled stack SS for ingestion by the insert module 30. A second portion SS2 of the shingled stack SS is also laid on the extensible and arcuate conveyor decks 50D, 100D of the OSO module 10. In this embodiment, it is assumed that the second portion SS2 of the shingled envelope stack SS extends the length of the OSO input module 10, i.e., from the input end 100I of the RAT input conveyor 100 to the output end 50E of the extensible conveyor 50. The second portion SS2, therefore, functions to replenish the supply of mailpiece envelopes 12, i.e., associated with the first portion SS1 of the shingled envelope stack SS, being are ingested by the insert module 30.

While FIGS. 3 and 4 depict the spatial relationship between the feed and extensible conveyors 40, 50, i.e., in the extended and retracted positions EX, HM, respectively, FIGS. 6*a*-6*f* depict the sequence for conveying, dispensing, and producing the prescribed gap PG in the mailpiece envelopes 12. In FIGS. 2, 6*a*-6*c*, the feed conveyor 40 incrementally conveys the first portion SS1 of the shingled envelope stack SS along the feed path FPE as the envelopes 12 are consumed by the insert module 30 (see FIG. 2). During this operation, the controller 130 drives the motor M2 of the feed conveyor 40 in response to a measured rate of envelope consumption by the insert module 30. That is, the motor M2 is essentially driven by an envelope consumption signal derived from the insert module 30.

As the mailpiece envelopes 12 are conveyed along the deck 38 of the feed conveyor 40 (FIGS. 6*b* and 6*c*), the aft end SS1A of the first portion SS1 of shingled envelopes 12 moves downstream, in the direction of arrow CA, away from the extensible conveyor 50, and away from the second portion SS2 of shingled envelopes 12. This operation produces a prescribed gap GP of known dimension (i.e., along the feed path FPE) in the shingled envelope stack SS, which gap GP which may be closed, i.e., made continuous, by the extensible conveyor 50 of the OSO input module 10. The first Envelope Position Detector (EPD) 110, disposed downstream of the extensible conveyor 50, senses the aft end SS1A of the first portion SS1 of shingled envelopes 12 at a first location L1 along the feed path FPE. The first EPD 110 issues a first position signal PS1, indicative of the discontinuity, to the processor 130 which controls the drive system 80 of the extensible conveyor 50, i.e., the extension/retraction of the extensible segment 62 and the motion of the envelope conveyors 40, 50, 100. In response to the first position signal PS1, the processor 130 activates the linear actuator 82 to extend the extensible conveyor 50 (see FIG. 6*d*) and advance the deck 50D, i.e., in the direction of arrow FA, toward the aft end SS1A of the shingled stack SS.

Figures 6A, 6B, 6C, 6D, 6E, 6F, 6G:
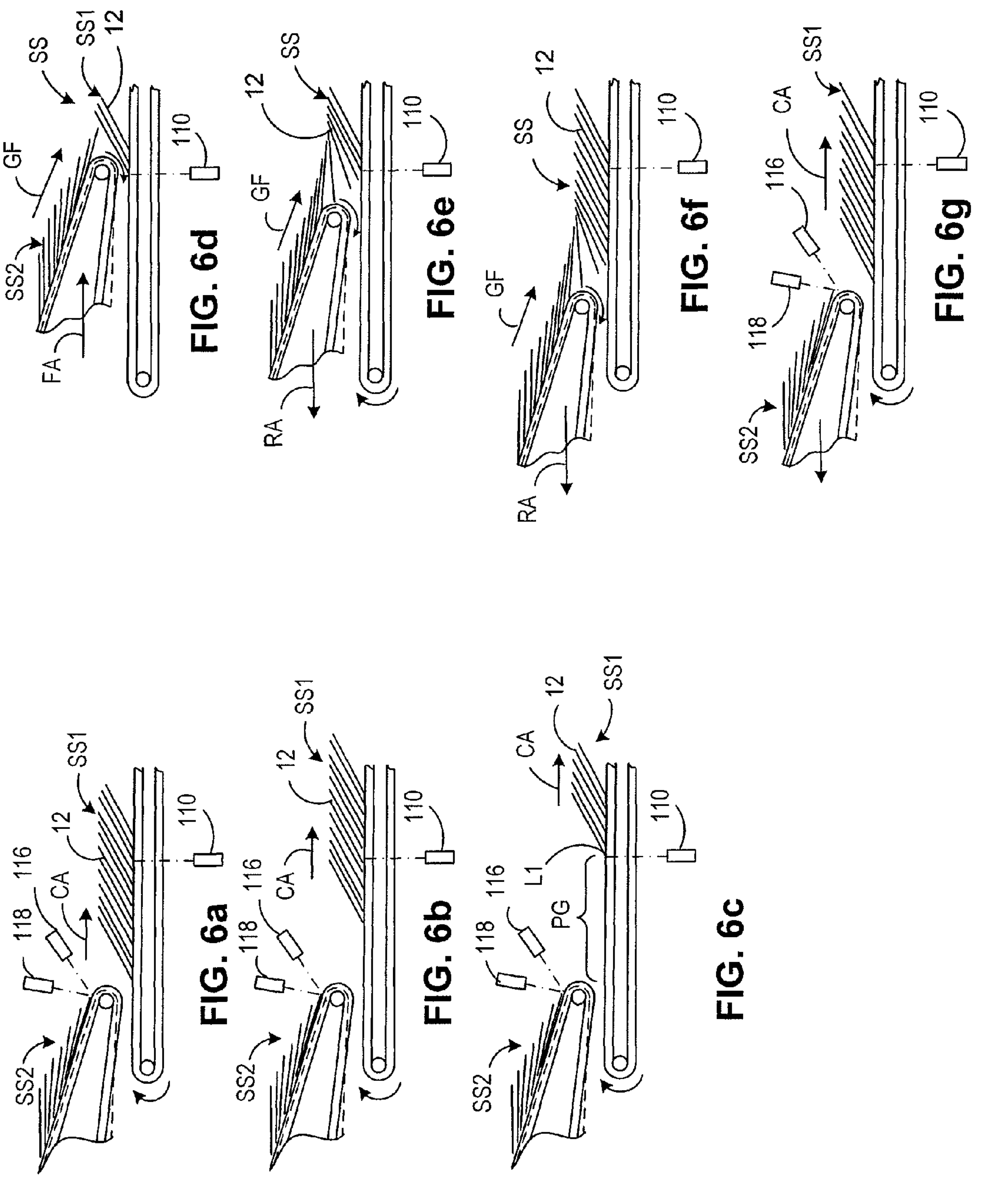
FIGS. 6*a* through 6*g* depict the movement of a shingled stack of envelopes on the feed and extensible conveyors, and the drive system to dispense the mailpiece envelopes on the extensible conveyor into shingled engagement with the mailpiece envelopes on the feed conveyor.

Forward motion of the extensible segment 62 is terminated when the first Conveyor Position Detector (CPD) 112 senses the fully extended position EX (see FIG. 4) of the extensible segment 62. More specifically, the first CPD 112 is disposed in combination with the sidewalls 68E, 68F of the extensible and fixed segments 62, 64 (see FIG. 5) and issues a fully extended position signal CPS1 when the extensible segment 62 reaches a threshold position, i.e., the fully extended position EX, relative to the fixed segment 64. In response to the fully-extended position signal CPS1, the processor 130 activates the drive system 80 such that the motor M1 drives the continuous belt 52 to dispense envelopes into shingled engagement with the aft end SS1A of the shingled stack SS1. FIG. 6*d* shows the envelopes being gravity fed from the inclined deck 50IN of the belt 52, in the direction of GF to the deck 38 of the feed conveyor 40.

After a short time delay, i.e., sufficient to allow the additional envelopes 12 to engage the first portion SS1 of the shingled envelope stack SS1, the processor 130 activates the linear actuator 82 to reverse direction while continuing to drive the belt 52. As a result, shingled envelopes 12 are dispensed while the extensible segment 62 retracts to a home position HM. Rearward motion of the extensible segment 62 is terminated when a second CPD 114 senses the home position HM. More specifically, the second CPD 114 is disposed in combination with the sidewalls 68E, 68F of the extensible and fixed segments 62, 64 and issues a fully retracted position signal CPS2 when the sidewall 68E associated with the extensible segment 62 reaches a threshold position, i.e., the fully retracted or home position HM, relative to the fixed segment 64. In response to the fully retracted position signal CPS2, the processor 130, deactivates the linear actuator 82 while continuing to drive the motors M1, M2, M3 of the feed and OSO input module conveyors 40, 50, 100. Control of these motors M1, M2, M3 to feed the shingled stack SS to the insert module 30 are discussed in greater detail below.

A second EPD 116 senses whether a discontinuity is present in the shingled stack SS at a second location L2, upstream of the first location L1, and corresponding to the home position HM of the extensible conveyor 50. If no discontinuity is sensed by the second EPD 116, the processor 130 synchronously drives the motors M1, M2, M3, to convey a steady stream of mailpiece envelopes 12 from the OSO input module conveyors 50, 100 to the feed conveyor 40, and, finally to the insert module 30. The processor 130, therefore, drives the motors M1, M3 of the OSO input module 10 synchronously with the motor M2 of the feed conveyor 40. It will be recalled that the motor M2 of the feed conveyor 40 is being driven in response to signals derived from the insert module 30.

If the second EPD 116 senses a discontinuity in the shingled stack SS at the second location L2, i.e., sensing an aft end SS1A of the first portion SS1 of the shingled envelope stack SS, a second position signal PS2 is issued by the second EPD 116. In response to the second position signal PS2, the processor 130, drives the motors M1, M3 of the OSO input module conveyors 50, 100 to "run-up" a second portion SS2 of the shingled envelope stack SS to a third location L3. More specifically, upon receipt of the second position signal PS2, the processor 130, drives the conveyor decks 50D, 100D at increased speed relative to the deck 38 of the feed conveyor 40 to rapidly convey the forward end SS2F of the second portion SS2 to a "ready position" at location L3 along the feed path FPE. This also has the effect of minimizing the length of the discontinuity as will be discussed in greater detail below.

A third EPD 118 senses when a forward end SS2F of the second portion SS2 of the shingled envelope stack SS reaches the ready position and issues a third position signal PS3 indicative thereof to the processor 130. The processor 130, then, stops driving the motors M1, M3 of the OSO input module conveyors 50, 100, but continues driving the motor M2 of the feed conveyor 40. As such, the second portion SS2 of the shingled envelope stack SS is advanced forward to the ready position at location L3, while the first portion SS1 downstream of the second portion SS2 continues toward the insert module 30. Hence, the motors M1, M3 of the OSO input module conveyors 50, 100 are no longer synchronized with the motor M2 of the feed conveyor 40. Although, the motor M2 of the feed conveyor 40 remains responsive, though the processor 130, to signals from the insert module 30. As the first portion SS1 of the shingled envelope stack SS progresses downstream of the extensible conveyor 50, the prescribed gap PG is once again produced and the cycle of extension, dispensation, retraction, run-up and envelope conveyance continues once again.

In the described embodiment, the second and third locations L2, L3 are essentially concurrent, i.e., lie at the same point along the feed path FPE, however, the second and third EDPs 116, 118 may lie in different planes to obtain a different perspective on the leading and trailing edges of the mailpiece envelopes 12. That is, by projecting a beam of light energy from an alternate perspective, the ability of a detector to sense the presence/absence of an envelope/stack of envelopes can be improved.

In another embodiment of the invention, the method for controlling the inserter 8 obviates run-out of mailpiece envelopes 12 to the insert module 30, and the requirement to re-prime the module 30 for ingestion of envelopes 12, i.e., a laborious task requiring the attention of a skilled operator. More specifically, should the OSO input module 10 lack a supply of envelopes to replenish the shingled stack SS, i.e., the processor 130, issues a shut-down signal to stop the motor M2 of the feed conveyor 40. In this embodiment, two criteria must be satisfied to execute an extension/retraction cycle of the OSO input module 10. More specifically, when the first EPD 110 detects a discontinuity at the first location L1, i.e., the location where the first and second portions SS1, SS2 of the shingled envelope stack SS are joined to produce a continuous stack SS, the third EPD 116 must also detect that the mailpiece envelopes 12 are queued, i.e., at the ready position at location L3, to initiate an extension/retraction cycle of the OSO input module 10. If no mailpiece envelopes 12 are detected at location L3, i.e., in the absence of a ready position signal PS3, the processor 130 shuts down the feed conveyor 40 and issues a cue to the operator to replenish a supply of mailpiece envelopes 12 on the OSO input module conveyors 50, 100. Consequently, the first or downstream portion of the shingled stack SS, i.e., extending from location L1 to the insert module 30, remains on the feed conveyor 40 to await the issuance of a "start-up" signal from the processor 130.

The operator replenishes the supply of mailpiece envelopes 12 by sequentially stacking envelopes 12, e.g., one box of envelopes at a time, at the input end of the OSO input module 10, i.e., the input end 100I of the RAT input conveyor 100. Inasmuch as the RAT input conveyor 100 bridges an upstream end of the chassis module 14 and curves into alignment with the input end 50I of the extensible conveyor 50, the operator may input mailpiece envelopes 12 from the workstation WS. It will be appreciated that the location of this workstation WS also accommodates input to the overhead feeders 14*a*-14*f* of the chassis module 14.

In another embodiment, it may be desirable to employ a fourth EPD 120, upstream of the second and third EPDs 116, 118, to sense a discontinuity in the shingled envelope stack SS, e.g., between a second and third portion SS2, SS3 thereof, at an upstream location L4. With this information, i.e., that a discontinuity has been sensed, a "flag" can be set such that the third EPD 118, or any of the other downstream EPDs 110, 116, can anticipate that a discontinuity, or gap in the shingled stack, will occur, when it will occur, and/or the length/duration of the gap/discontinuity in the shingled stack SS.

Figure 7:
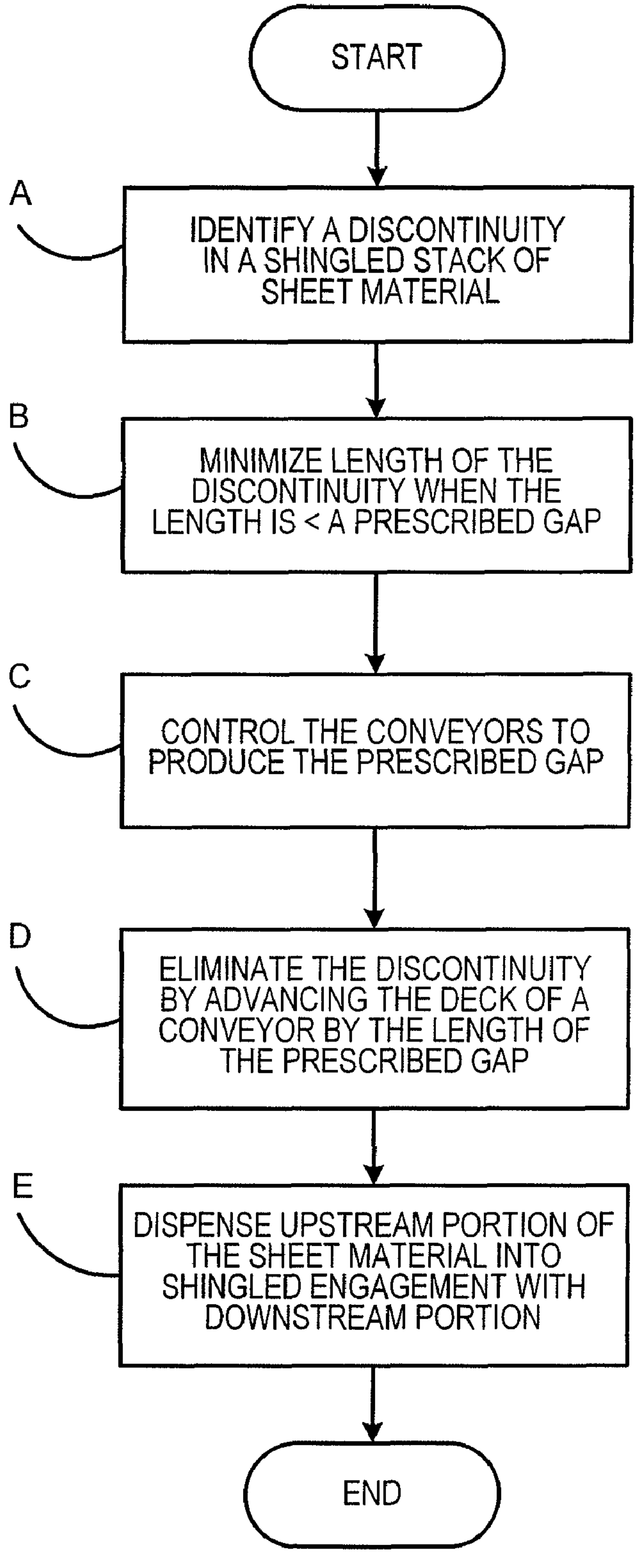
FIG. 7 is a flow diagram of the method steps employed to control the motion of the OSO input module and feed conveyor as mailpiece envelopes are delivered to the feed station.

From the foregoing, it will be appreciated that the OSO input module 10 facilitates one-sided operation, i.e., from a single workstation WS or area, by permitting interruptions, or a discontinuity, in the shingled stack of envelopes. That is, the OSO input module 10 allows an operator to attend to the overhead feeders 14*a*-14*f* of the chassis module 14 while one or more gaps/discontinuities develop in the shingled stack SS along the feed path of the input module 10. In FIG. 7, a flow diagram of the method for controlling a mailpiece inserter 8 having an OSO input module 10 is summarized. More specifically, in the described embodiment, the method for controlling the mailpiece inserter 8 includes the steps of: (A) identifying a discontinuity in a shingled stack, (B) minimizing the length of the discontinuity (i.e., the dimension from the aft end of a downstream portion of shingled envelopes to a forward end of an upstream portion of shingled envelopes) when the length dimension is less than a prescribed gap PG of known length dimension, (C) controlling the motion of first and second serially arranged conveyors, i.e., the OSO input module and feed conveyors 40, 50, 100, to produce the prescribed gap PG, (D) eliminating the discontinuity by advancing the conveyor deck 50D of the extensible conveyor 50, and the shingled envelopes disposed thereon, by the length of the prescribed gap, and (E) dispensing the upstream portion into shingled engagement with the downstream portion.

In step B, the length of the discontinuity may be minimized by increasing the speed of the OSO input module conveyors 50, 100 relative to the speed of the feed conveyor 40 when the discontinuity passes from the OSO input module 10 to the feed conveyor 40. This discontinuity is sensed by the second EPD 116 which monitors when the aft end SS1A of the first/downstream portion SS1 of the shingled envelope stack SS has been dropped, gravity fed, from the inclined deck 50DIN of the extensible conveyor 50 to the feed conveyor 40.

In step C, the second or upstream portion SS2 of the shingled envelope stack SS is retained on the conveyor decks 50D, 100D of the OSO input module 10 while the first or downstream portion SS1 of the shingled envelope stack SS is conveyed forward, along the deck 38 of the feed conveyor 40 toward the insert module 30. Conveyance of the first portion SS1 continues until the discontinuity is sensed by the first EPD 110. Additionally, the motion of the second portion SS2 is retained in response to a signal issued by the third EPD 118.

In step D, the discontinuity is eliminated by cycling the OSO input module 10 and advancing the deck 50D of the extensible conveyor 50. In one embodiment shown in FIGS. 3, 4 and 5, the deck 50D is advanced by wrapping a continuous belt 52 around a plurality of rolling elements 66E, 66F in a serpentine pattern. The serpentine pattern defines a recurved segment RS which shortens as the conveyor 50 extends and lengthens as the conveyor retracts. In another embodiment shown in FIGS. 8 and 9, the continuous belt 52 wraps around a plurality of rolling elements 66E, 66F in an path having a recurved segment RS2 which projects downwardly from the horizontal deck 52H. Furthermore, the recurved segment RS2 wraps around a spring-biased rolling element 66M which translates vertically within a linear track or guide 66G, The rolling element 66M moves upwardly, against a force induced by a tension spring 67, in response to extension of the extensible segment 62, and downwardly, under the influence of the spring 67, in response to retraction of the extensible segment 62.

In step E, the discontinuity in the shingled stack SS is eliminated by driving the belt 52 of the extensible conveyor 50 to dispense envelopes 12 into shingled engagement with the shingled stack SS1 of envelopes 12 disposed on the feed conveyor 40. CPDs 112, 114 sense the extended and retracted positions EX, HM and issue signals CPS1, CPS2 to the drive system 80, through the processor 130, to cycle the extensible conveyor 50.

Although the invention has been described with respect to a preferred embodiment thereof, it will be understood by those skilled in the art that the foregoing and various other changes, omissions and deviations in the form and detail thereof may be made without departing from the scope of this invention. For example, while envelope position detectors 110, 116, 118, 120 employed are photocells, the EPDs may be any device capable of detecting when a mailpiece envelope is present or absent. Furthermore, while the OSO input module 10 extends fully to bring envelopes into shingled engagement with the first portion SS1 of the shingled stack SS and employs a conveyor position detector 112 to indicate when the extensible segment 62 is fully extended, a plurality of EPDs and CPDs 110, 112 may be employed along the feed path FPE and between the segments 62, 64 such that the extensible segment 62 extends to an intermediate location, i.e., between the fully extended and fully retracted positions EX, HM. As such, the plurality of EPDs 110 may provide information concerning the instantaneous position L1 . . . LN of the shingled envelopes along the feed conveyor 40 and the CPDs may be employed to vary the length of extension along the feed path FPE. It should, therefore be understood that the present invention is not to be considered as limited to the specific embodiments described above and shown in the accompanying drawings. The illustrations merely show the best mode presently contemplated for carrying out the invention. The invention is intended to cover all such variations, modifications and equivalents thereof as may be deemed to be within the scope of the claims appended hereto.

The invention claimed is:

1. A mailpiece inserter comprising:

a feed conveyor adapted to feed a shingled stack of mailpiece envelopes along a feed path to an insert module;

a chassis module adapted to produce content material for insertion into the mailpiece envelopes processed by the insert module, the chassis module having a workstation for an operator to feed content material;

a first envelope position detector for sensing a discontinuity in the shingled stack of mailpiece envelopes at a first location along the feed path and issuing a first position signal indicative thereof; and an input module adapted to convey mailpiece envelopes into shingled engagement with an aft end of the shingled stack of mailpiece envelopes on the feed conveyor; the input module having an input end proximal to the workstation of the chassis module to enable an operator to feed mailpiece envelopes to the input module and content material to the chassis module, and an output end aligned with the feed path of the feed conveyor to dispense mailpiece envelopes, the input module having an extensible conveyor, responsive to the position signal, to advance an input module conveyor deck toward the aft end of the shingled stack on the feed conveyor and dispense mailpiece envelopes into shingled engagement therewith.

2. The mailpiece inserter according to claim 1 wherein the input module includes a right angle turn conveyor disposed upstream of the extensible conveyor, the right angle turn conveyor having an arcuate transport deck extending from the operator workstation of the chassis module to an input end of the extensible conveyor.

3. The mailpiece inserter according to claim 1 wherein the extensible conveyor dispenses mailpiece envelopes onto the feed conveyor and retracts the conveyor deck from an extended position to a home position.

4. The mailpiece inserter according to claim 1 wherein the extensible conveyor includes a belt for conveying the mailpiece envelopes, the belt having a horizontal deck and an inclined deck downstream of the horizontal deck for dispensing the mailpiece envelopes into shingled engagement with the shingled stack disposed on the feed conveyor.

5. The mailpiece inserter according to claim 4 wherein the inclined deck defines slope angle within a range of between about forty degrees (40°) to about ten degrees (10°).

6. The mailpiece inserter according to claim 5 wherein the slope angle is being within a range of between about thirty degrees (30°) to about fifteen degrees (15°).

7. The mailpiece inserter according to claim 3 further comprising a second envelope position detector disposed upstream of the first position detector, the second position detector operative to sense a discontinuity in the shingled stack of mailpiece envelopes at a second location along the feed path and issuing a second position signal indicative thereof, the extensible conveyor discontinuing dispensation of mailpiece envelopes in response to the second position signal.

8. The mailpiece inserter according to claim 7 wherein the input module conveyor is driven at an increased speed relative to the feed conveyor to advance the shingled envelopes on the input module conveyor toward the shingled envelopes on the feed conveyor, and reduce the length of the discontinuity between the aft end of the shingled stack on the feed conveyor and a forward end of the shingled stack of envelopes on the input module conveyor.

9. The mailpiece inserter according to claim 7 further comprising a third envelope position detector operative to sense when the forward end of the shingled stack of envelopes on the input module conveyor reaches a ready position, and issues a third position signal indicative thereof, the input module and the feed conveyors, responsive to the third position signal, to convey the shingled stack of mailpiece envelopes on the feed conveyor downstream toward the insert module while terminating conveyance of the shingled stack of mailpiece envelopes on the input module conveyor, thereby producing a prescribed gap of known length dimension along the feed path.

10. The mailpiece inserter according to claim 9 further comprising a processor operative to terminate conveyance of the feed conveyor upon receipt of first position signal and upon sensing the absence of the third position signal thereby indicating the absence of shingled envelopes to replenish the shingled stack on the feed conveyor.

11. The mailpiece inserter according to claim 1 wherein the extensible conveyor includes:

a continuous belt defining a deck disposed over the feed path for conveyance and delivery of sheet material to an aft end of the shingled stack;

an extensible support structure having fixed and extensible segments, each of the segments having a plurality of rolling elements for supporting and accommodating motion of the continuous belt about each of the rolling elements, the extensible segment adapted for movement relative to the fixed segment in a direction substantially aligned with the feed path, the continuous belt defining a recurved portion, the recurved portion varying in length to accommodate relative motion of the fixed and extensible segments, and a system for extending/retracting the extensible segment to the aft end of the shingled stack of sheet material and for driving the continuous belt to dispense the sheet material into shingled engagement with the aft end of the shingled stack.

12. The mailpiece inserter according to claim 11 wherein the recurved segment is produced by wrapping the belt around the rolling elements in a serpentine path.

13. The mailpiece inserter according to claim 11 wherein the recurved segment is produced by wrapping the belt around a rolling element capable of displacing linearly by an amount equal to the displacement of the extensible segment.

* * * * *